Inventors.
John Reece
Franklin A. Reece
by Rogers, Kennedy & Campbell,
Attys.

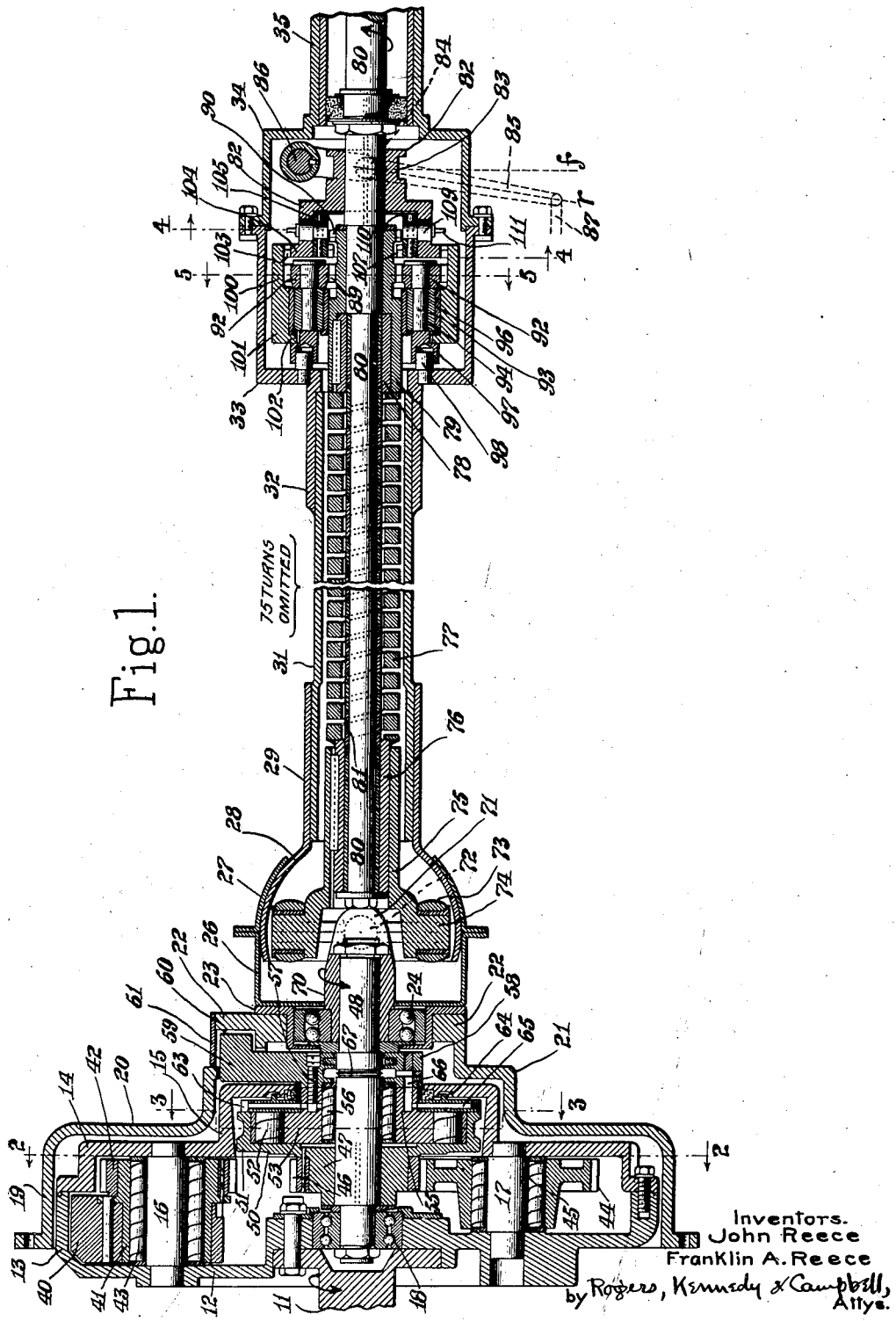

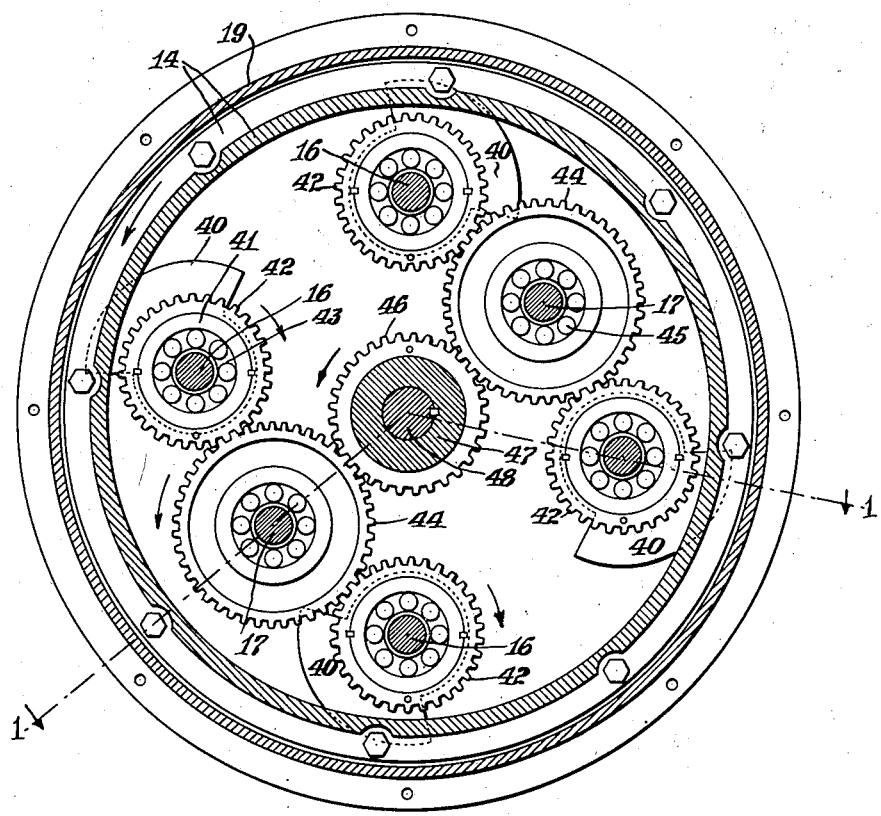

Patented June 18, 1929.

1,717,466

UNITED STATES PATENT OFFICE.

JOHN REECE, OF BOSTON, AND FRANKLIN A. REECE, OF BROOKLINE, MASSACHUSETTS, ASSIGNORS TO REECE TRANSMISSION COMPANY, OF BOSTON, MASSACHUSETTS, A CORPORATION OF MAINE.

POWER TRANSMISSION.

Application filed December 18, 1925. Serial No. 76,219.

This invention relates to power transmission, and involves apparatus adapted to be used in various situations and for various purposes where varying speeds of transmission are required, for example as a part of the power transmission apparatus of motor vehicles, especially those in which the source of power is an internal combustion engine.

The general object of the invention is to afford more effective and convenient power transmission for the purposes mentioned, and more particularly to provide a mechanism wherein the speed ratio and delivered torque are self adjusting to the conditions of load or resistance; and whereby the prevailing clutch and change speed gears used on motor vehicles are dispensed with. An instance of transmission apparatus of this class is shown in the prior patent of one of us, Number 1,461,557 of July 10, 1923. In such prior structure, a number of centrifugal masses are employed, each movably mounted so that it can travel outwardly and inwardly, in a circular or planetary path, upon a revolving support which is turned by the power of the engine, each mass being attached to the planetary carrier or gear, the latter having connections from a driven part of the apparatus such that the mass is caused to planetate at a rate dependent on the difference in speed between the driving and driven members or shafts; each mass being thus, in one phase, forced inwardly against its centrifugal force, which force is thus transmitted as driving torque to the driven shaft, until the mass, reaching its innermost position enters a second phase and moves outwardly, while a pawl and ratchet, or other one-way device, then coming into action, prevents the transmission of the centrifugal force as a reverse drive to the driven shaft; the intermittent impulses or thrusts thus delivered being converted into a constant resilient thrusting torque upon the ultimate driven shaft through a driving or propelling spring, interposed at a point between the pawl and ratchet and the ultimate shaft, into which spring the energy is delivered by impulses, stored, and drawn out steadily by the shaft. While such prior apparatus will deliver torque at self adjusting speed ratio from an engine to a driven shaft, the operation and action are not wholly effective and satisfactory for motor vehicle purposes; and a special object of the present invention is to improve upon the prior apparatuses in various respects, and thus render the stated principles practically available for the uses set forth. The several specific features of improvement and the advantages thereby attained will be elucidated in the hereinafter following description of an illustrative embodiment of the invention, and other advantages will be apparent to those skilled in the subject.

To the attainment of the objects and advantages referred to the present invention consists in the novel power transmission apparatus, and the novel features of combination, arrangement, operation, mechanism and detail herein illustrated or described.

In the accompanying drawings Fig. 1 is a central section, the upper half taken on a substantially horizontal radius looking down and the lower half on an inclined radius looking from the left, as indicated by the bent line 1—1 in Fig. 2. Such words as left, right, front and rear will be used herein with respect to the employment of the apparatus in a motor vehicle.

Fig. 2 is a transverse section taken on the line 2—2 of Fig. 1, looking from the rear.

Fig. 3 is a transverse section taken on the broken line 3—3 of Fig. 1, also looking from the rear; with a modification in the character of the rolling elements.

Figure 4:
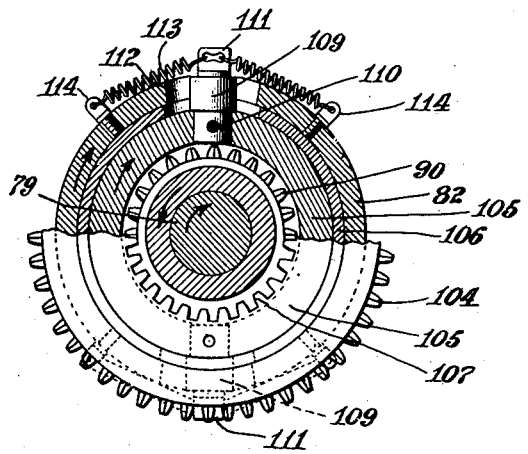
Fig. 4 is a transverse section on an enlarged scale taken on the line 4—4 of Fig. 1 and looking from the front.

It will be convenient to describe the present invention in the following order. First will be described the "driving" parts, which turn with, or are revolved by, the engine shaft; next the fixed casing enclosing these and others of the parts; then the centrifugal masses, which are revolved or carried around by the driving parts to create centrifugal force therein; next the mechanical connections by which the centrifugal masses are actuated, or caused to be drawn inwardly against the centrifugal force, whereby such force is delivered through such connections; then the driven parts which precede the transmitting spring, and are therefore not the final driven parts, and which for convenience may be termed the intermediate parts of the transmission, these parts, when turning slower than the driving parts, operating through the connections to actuate the centrifugal masses; then the one-way device or controller, in the nature of a pawl and ratchet, permitting the intermediate parts to rotate forwardly but preventing backward rotation; then the transmitting spring or equivalent resilient propelling device, acting as a power reservoir, receiving energy from the intermediate parts and supplying it to the ultimate driven parts; then the final driven parts, or driven shaft, which in a motor vehicle is in direct mechanical connection with the vehicle axles and wheels. Supplementally will be described a suitable reversing mechanism for changing the direction of drive of the driven parts; and an oil circulation system.

The power or driving shaft 11, shown in Fig. 1, may be the crank shaft of an internal combustion engine. To this is attached a revolving support or disk 12, which at its periphery is extended into a cylindrical wall or shell 13, and secured over the rear end thereof is a cover or disk 14, extending inwardly and there enlarged or extended rearwardly at 15 to enclose the elements of the one-way device. Extending between the disks 12 and 14 are a number of studs 16 and 17, the former positioned to receive the planetating masses to be described, and the latter to receive certain connecting gears. The elements thus far enumerated constitute substantially the driving parts of the apparatus, and owing to their substantial weight and diameter they constitute also in effect a fly wheel. Inside of the hub of the driving disk 12 is shown a ball bearing 18 within which the interior parts rotate.

Enclosing these and other parts is a fixed outer or main casing 19, which at its rear side is extended inwardly as an annular wall 20 having a rear extension 21 to accommodate the extension 15 already mentioned, and with an enlargement at 22 to accommodate certain fixed parts. The extreme rear of the main casing terminates in a fixed hub 22 within which is mounted a double flanged sleeve 23 supporting a ball bearing 24 within which the interior parts rotate. Certain other fixed parts extending from the main casing toward the rear axle may conveniently be described at this point. Attached at the rear side of the sleeve member 23 is shown a cylindrical shell 26 having a spherical extension 27 attached to it. An interior spherical shell 28 fits the other and permits universal play. The shell 28 is extended rearwardly as a sleeve 29 inside of which may be attached a spacing ring to hold the parts concentric. Inside the sleeve 29 is shown an elongated tube 31 constituting the housing of the interior propelling means to be described. The housing 31 may slide and rotate freely in the sleeve 29 to give universal play as is desirable with motor vehicles. The rear end of the propeller housing 31 may be secured within a sleeve 32 which is enlarged at 33 to constitute the front half of a gear casing for the reversing gears to be described, the rear half 34 being secured by bolts thereto, and formed into a reduced sleeve 35 extending rearwardly as a shaft housing to the point where the usual rear end bevel gears and differential may be provided.

The centrifugal masses 40, are four in number, each arranged to move inwardly and outwardly in a planetary path by being mounted on a sleeve 41 which carries also a planetary gear 42, each sleeve surrounding one of the studs 16, with roller bearing 43 interposed. As a means of planetating the gears 42 and thereby actuating the centrifugal masses are shown idler gears 44 meshing with the gears 42 and mounted on the studs 17 with roller bearings 45 interposed. The idler gears are also in mesh with a central gear 46 having a hub 47 which is keyed to the intermediate or propeller shaft 48. By this arrangement when the propeller shaft is held stationary or is rotating slower than the driving parts the idler gears 44 will planetate in the direction of the arrows in Fig. 2, so that the planet gears 42 and the centrifugal weights are caused to planetate in a direction the opposite of the revolution of the fly wheel, as indicated by the arrows.

During the inward movement or phase of each centrifugal mass the centrifugal force of the mass opposes the load on the shaft and is therefore applied as a driving torque. During the outward or return phase each of the masses would tend to rotate the shaft in the wrong direction but for the interposition of a one-way device in the nature of a pawl and ratchet. A suitable one-way device may be as follows. The hub 47 of the central gear 46 is shown extended as a disk 50, the outer edge of which is formed into a rim 51. Inside this rim, as seen in Figs. 1 and 3, is a series of rolling pawls or wedging rolls 52, which may be solid as shown in Fig. 3 or hollow and slit as in Fig. 1 to give a certain cushioning effect. These rollers are arranged to be wedged between the rim 51 and a series of abutments 53 whenever the rim tends to turn clockwise in Fig. 3, that is in a direction the opposite to the revolution of the driving parts. A spring 54 is arranged to hold each of the wedging rollers in its operative position. There being a circular series of these silent or friction pawl and ratchet devices. a very quick and effective gripping or locking action is produced preventing the propeller shaft 48 and the attached wedging rim from turning in the wrong direction.

To secure this action it is necessary to hold stationary the abutments 53 and for this purpose their hub 55 is extended rearward for attachment to certain exterior elements, a series of bearing rollers 56 being interposed between the hub 55 and the shaft 48. The hub 55 is attached by screws 57 to a stationary ring 58 surrounding the shaft and having an anchoring arm 59 extending outwardly, with an offset end engaging in an anchoring recess 60 in the casing part 22, a removable cover 61 giving access.

A system of lubrication may comprise a rotary oil deflector 63, arranged to divert the loose oil in the casing in an inward direction. The deflector has at its rear side a flange or oil guard 64 entering an annular recess in the rotating shell 15. The whirling oil diverted by the deflector 63 passes radially inward along a channel 65 and thence into a longitudinal channel 66 which extends into the ring 58 and thence delivers radially inwardly to a peripheral oil groove 67 in the propeller shaft, from which the oil may be distributed as desired through channels 68 in the shaft.

The rotary connections rearward from the propeller shaft 48 to the rear wheel axle may include the following. The rear end of the shaft 48 has attached to it a sleeve 70 with ears 71 extending rearwardly. Opposite studs 72 connect the ears with a gimbal ring 73 which supports a pair of studs 74 at right angles to the studs 71 and carried on a sleeve 75. This sleeve extends rearwardly and has splined to it with a sliding fit an interior sleeve 76 to which the propeller spring 77 is attached. This spring is of sufficient cross section and strength to transmit the torque presented in practice, and yet is capable of yielding sufficiently to insure that the driven shaft will not overrun the spring and propeller shaft. This is accomplished by greatly enlarging the capacity of the spring, namely by prolonging it as shown, the break in Fig. 1 representing a large number of convolutions omitted, as the spring may have from 90 to 95 turns more or less. The illustrated propeller spring 77 is capable of being strained intermittently to impress power into it at the forward end while relaxing steadily at the rear end to deliver continuous drive to the driven parts. It will be clear that it is important that the spring remain under such a degree or extent of yield during the driving phases of the propeller shaft that its strain will never be wholly taken up during the phases of non-rotation of the propeller shaft. The rear end of the propeller spring is shown attached to a sleeve 78 which in turn is keyed to the forward end of a sleeve 79. the rear end of which directly surrounds what may be termed the driven shaft 80. This driven shaft may conveniently be extended forwardly through the spring as shown for the purpose of preserving alinement between the sleeves at the front and rear ends and the portion of this shaft inside the spring may be surrounded with a series of loose rings 81 which will not prevent continued rotation of the spring in case it should contract into contact with the rings. On the driven shaft 80 to the rear of the sleeve 79 is shown a sliding collar 82 grooved at 83 and engaged by the studs 84 of a reversing lever 85 fulcrumed at 86 and connected by a link 87 with a pedal or other control lever at the forward part of the vehicle. When the lever 85 is in the position marked r, as shown, the parts are in adjustment for reverse drive, and the arrows show that the driven shaft 80 is turning in a direction the opposite of the propeller shaft 48 and the driving shaft 11. When the lever 85 is shifted to position f the reversing gears within the casing 33, 34 are shifted to cause forward drive of the driven shaft and rear wheel axles connected therewith.

Figure 5:
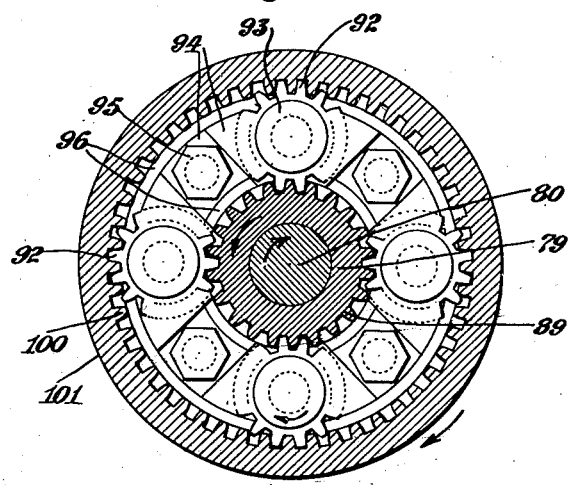
Fig. 5 is a similar section taken on the line 5—5 of Fig. 1, looking from the rear.

The drive reversing mechanism is shown in Figs. 1, 4 and 5. An advantageous feature of the illustrated mechanism is the separation of the reversing gears from the transmission devices, and placing them to the rear and beyond the transmitting or propeller spring 77, namely between said spring and the eventual driven shaft. By this arrangement the intermittent or pulsating action which occurs in the transmission mechanism and in the propeller shaft 48 is not carried into the reversing gears, which on the contrary will rotate in a steady manner as the driven shaft draws power from the propeller spring, resulting in a smoother and more efficient action of the reversing gear.

There has already been mentioned the sleeve 79 loosely surrounding the driven shaft 80, and the collar 82 splined to the driven shaft to the rear of the sleeve 79. The reversing mechanism to be described operates to couple together the sleeve 79 and the collar 82 in one or the other of two different ways, one giving reverse drive, illustrated by the position of the parts in the drawing and by the position of the shifting lever 85, the other giving forward drive, when the parts are shifted in a manner produced by the throw of the lever 85 from position r to position f. The portion of the sleeve 79 which immediately surrounds the driven shaft 80 carries or is formed into a central gear 89, and to the rear thereof has a similar set of teeth 90 constituting however a clutch rather than a gear. The central gear 89 on the sleeve 79 engages a number of idler pinions 92. Four of these are shown surrounding the shaft. These pinions are arranged to rotate but not to planetate. Each of them is shown mounted on a stud 93 and these studs all take their bearing in a carrier ring 94, parts of which, as seen in Fig. 5, are countersunk to receive certain attaching bolts 95 by which the carrier ring is held stationary. Friction linings or sleeves 96 are arranged inside and outside the carrier ring on account of the rotation of the parts within and surrounding the same. To the front of the carrier ring is a stationary ring 97 to which the carrier ring is secured by the bolts 95, and the stationary ring 97 in turn engages a series of fixed studs 98 which are fitted into recesses in the casing 33 and in the front face of the ring 97. By this arrangement the carrier ring 94 is held stationary so that the pinions 92 all continuously rotate while sleeve 79 rotates. As the sleeve 79 and gear 89 turn counterclockwise in Fig. 5 the pinions 92 will all turn clockwise. Surrounding the described parts is an internal gear 100 engaging the several pinions 92, and therefore turning clockwise. The internal gear is formed or mounted at the inner side of a rotary drum 101 which at its front edge has an inward positioning flange 102. In addition to the gear teeth 100 the rotary drum carries near its rear end a set of teeth 103 forming one part of a clutch. These appear in Fig. 1 but being between the section lines 4 and 5 do not appear in Figs. 4 or 5, but will be understood to correspond substantially with the teeth 100 constituting the internal gear. These clutch teeth 103 are adapted, by axial sliding, to engage or disengage a complementary set of clutch teeth 104 provided at the outer front end of the enlarged portion of the collar 82 which is keyed to the driven shaft 80, so that when the clutch members are in mesh, as shown in Fig. 1, the clockwise rotation of the drum 101 is transmitted directly to the collar 82 and to the driven shaft, reverse drive in this way being communicated to the driven shaft. The engaging edges of clutch teeth 103, 104 are shown chamfered to facilitate engagement.

Forward drive may be secured by means of the following additional mechanism and a shifting of the adjustment in the manner already described. The enlarged part of the collar 82 which carries the clutch teeth 104 at its outer side carries at its inner side a ring 105, which may be considered substantially as a part of the driven shaft collar, but has a resilient or cushioned connection therewith as will be described. A lining sleeve 106 may be interposed between the collar and ring as indicated in Fig. 4 on account of the relative movements thereof. At the inner side of the ring 105 are teeth 107 constituting one member of a clutch, the other member of which is constituted by the external teeth 90 on the sleeve 79 already mentioned. These are shown out of engagement in Fig. 1, but they are adapted to be brought into clutching engagement when the collar 82 is shifted rearwardly by the reversing lever, both sets of teeth having chamfered engaging edges as shown. In order to permit ready and smooth engagement of teeth 90 and 107, without having to shift one of the clutch members, the ring 105 carrying teeth 107 is elastically connected to the driven shaft collar 82. Thus, as shown in Figs. 1 and 4, a pair of radial posts 109 are mounted on the ring 105 by pins 110, each post extending outwardly and having an eye 111 at its extremity. While each post is fixed in the cushioned ring 105 it is able to move circumferentially within a recess 112 formed in the collar 82. It is however normally held in a relatively central position with respect to the recess by means of a pair of tension springs 113, each secured at one end to the eye 111 and extending in opposite directions to a pair of pins 114 attached to the collar 82. It will be understood that when the shift lever 85 is shifted from position $r$ to position $f$ this brings about the clutch engagement just described, and as the collar 82 shifts rearwardly for this purpose its teeth 104 are also carried rearwardly out of engagement with the internal clutch teeth 103 of the constantly reversely rotating drum 101, thus discontinuing reverse drive conditions simultaneously with the initiating of forward drive, and vice versa, it being understood that the operator will bring the driven shaft and vehicle to rest before throwing the lever 85 and changing from forward to reverse drive or vice versa. It will be observed that in the act of making this shift both the forward and reverse drive connections will be coupled momentarily, thus momentarily locking the driven shaft against rotation, and preventing release of the rear end of the propeller spring, which if under strain would snap and produce impact, so that this overlapping engagement prevents damage to the chamfered teeth.

Referring again to the propeller spring 77, its characteristics and advantages will be best explained by comparison with the nearest prior structure, which so far as we know is that shown in said prior Patent 1,461,557. In that patent the transmitting spring is short and of inadequate capacity and strength for the purposes of the present invention. The spring of the prior patent is helical and consists of only twenty convolutions, being so small in fact that it is accommodated wholly within the transmission casing, while the following driven shaft occupies the greater part of the longitudinal distance from the transmission to the rear axle. Practical experiments have indicated that the prior spring is inadequate for motor car purposes. The available amount of yield or strain of the spring is insufficient, and the strain will be, at certain times and under certain conditions of heavy load, wholly taken up, and the transmission will then operate as though the intermediate and driven shafts were solidly connected, without interposed spring. Moreover under certain conditions of light load it is possible that the driven parts will overrun the spring and intermediate parts, rendering the transmission of torque discontinuous, with the result that there will be transmitted to the vehicle a distinctly pulsating drive, which may be quite appreciable in the movement of the vehicle itself. It is true that the prior patent states that the spring can yield by the amount of several complete turns, but this was only done by the special plan shown in said prior patent of making a number of convolutions of relatively low strength, the result of which would be a breakage or impairment of the spring under the hardest conditions, unless indeed the spring is supplemented and backed up, as is shown in the patent namely by interior stop rings, which limit the contraction of the helical spring. But this necessary expedient in itself tends to prevent the frequently necessary extent of yield. Furthermore, while the prior spring may yield several turns with heavy loads and low speed ratio, as stated in the patent, this is not the only condition responsible for the objectionable pulsating action. A high load will give a large strain upon any propeller spring and wind it up a substantial amount. It is when the load is light and the ratio is high, or near unity, that the pulsating drive action is found to occur, for example at a ratio of six to five. When the driven shaft is thus turning slightly slower than the driving or engine shaft each of the centrifugal masses will be pulled slowly inward during about five and one half turns of the driving shaft, and will then move rapidly outward for about one half turn of the driving shaft. During the first or prolonged phase torque will be transmitted to the intermediate parts, spring, and driven shaft, but during the brief return phase the intermediate parts are momentarily stationary, while the driven parts continue in rotation, and may overrun the propeller spring and intermediate parts if the spring at this time is under insufficient yield or strain. It may be shown that if the propeller spring, during the transmitting phase, is placed under a strain or yield of about one complete turn, or 360° more or less, continuous transmission will ordinarily be assured, whereas if the yield is only about a half turn of 180°, or less, the irregular or pulsating transmission will result.

The plan of the present improvement therefore is to employ a spring such that about or at least a full revolution of yield will occur in each cycle, under any practical conditions of load and ratio, and which yet will be strong enough, without impairment, to transmit torque at low ratio for overcoming even the heaviest loads. The proper strength may be assured by employing spring steel of high quality and of cross section sufficiently large, and preferably uniform. A short spring of this character would not yield enough to prevent the overrunning trouble. But by employing a spring of this character and greatly elongating the length of metal used in the spring, and the longitudinal length of the helix itself, the proper amount of yield is assured. As already stated this is herein accomplished by providing a propeller spring 77 of moderate helical diameter and maximum longitudinal length. The principles involved are distinct from those explained in the prior patent, and give the result of smooth and continuous transmission not afforded by the patent, and overcome a troublesome defect.

In order to make more clear the principles of the improvement in discussion, so as to enable those skilled in the art to practice the same, a specific instance may be described. Supposing an internal combustion engine delivering torque of 100 foot pounds through a fly wheel and transmission of the class herein referred to, the propeller spring may be of the following character. The mean diameter of the spring or helix may be 2" and the number of convolutions 90 to 95 more or less, so that in Fig. 2 about 75 turns may be considered as having been omitted from the middle to condense the illustration. The longitudinal length of the spring may be about 5' 6", more or less. The wire or rod from which the spring is made may be of square cross section, as shown, with dimensions of 7/16" deep and 1/2" wide. The metal may consist of chrome vanadium steel heated to 1650° F., and drawn to 650° F. The minimum yield of such a spring occurring in each cycle will be in the neighborhood of 360°, and will be three times as great under a torque of 300 foot pounds. In order to show the delicacy of the problem solved by this invention it is pointed out that if the propeller spring be weakened by reducing the depth of its cross section from 7/16" to 6/16" the maximum practical stress would impose too high a strain on the spring and run the danger of breaking or permanently distorting it. If on the other hand the depth be increased to 8/16" the spring will be too stiff, and the extent of yield may be reduced to an amount perhaps as low as 180°, which under certain speed ratios will permit the driven shaft to overrun the spring, and give the objectionable pulsating action. The improvement therefore is clearly not one of mere degree over the prior patent since the increase of length of the spring introduces a new factor and gives a new sort of result, not previously attained. While the full 5 1/2 feet of longitudinal length of the propeller spring may not in all cases be necessary, the length of spring shown in the prior patent is insufficient for the purposes of the present invention, and, without the special expedients characterizing the patent, would have to be enlarged to an extent such that, with an elastic strength sufficient to prevent impairment under the greatest stress, the spring nevertheless will afford a yield great enough to insure against overrunning and consequent objectionable pulsating drive.

It has been stated that each mass 40 passes through a cycle comprising two phases, that in which it is forced inwardly, or toward the general axis and that in which it is allowed to return outwardly, also that this motion is in a planetary path on the driving member, and the mass traveling around said path in a direction the opposite to the revolution of the driving member or support 12. This opposite direction of planetation of such a mass is of much importance, although the particular gearing shown could be replaced by a simple sprocket or belt or other equivalent. The carrier or mounting 41, 42 represents any device on the driving member compelling the mass to follow its definite path inwardly and outwardly. The connections or gearing from the driven shaft operate on the device or on the mass to cause the planetating actuation. If the revolution and planetation were in the same direction, as, they are in said patent, the mass would travel from outer to inner position with speed decreasing from maximum to minimum, and in the return phase increasing from minimum to maximum, with the result that the centrifugal force during the inward movement is not sufficiently effective for practical transmission, at least without adopting quite inconvenient gear ratios. Reversing the planetating direction causes the mass to move steadily or at uniform speed from outer to inner position, or without slowing down, giving the best transmitting effect, due to the advantageous utilization of the centrifugal force. Throughout each phase of its movement the mass may be considered as revolving about a center on the driven member or shaft, which center is eccentric to the general axis, and which may of course itself travel around, with the driven shaft, when the latter turns. This center, which may be imaginary or real, forms with the driven shaft, in effect, a couple or crank arm, and the centrifugal force of the mass in its in-phase pulls forwardly and delivers forward thrust to the driven shaft. During the second or out phase the mass remains under definite mechanical control, due to the one-way device, which allows the mass to return smoothly to its initial or outer dead center position at steady speed, or without substantial acceleration, whereupon the first phase or action again commences, and another torque delivery effected. If the driven shaft 48 be held stationary, with the gearing shown, gears 42 and 46 having the same diameter, the mass center will traverse a true eccentric circle in space, while planetating on the driving member studs 16. When the driven shaft is not rotating it is believed that substantially no energy or torque is drawn from the driving member, except that necessary to overcome friction, whereas when the driven shaft is turning, the masses will require and draw torque from the driving member, in greater amount the higher the driven speed, until at unit ratio, when the masses cease planetating, the maximum torque or engine power is required to effect the drive. Owing to these several features the described transmission is both effective and saving of power. Each of the centrifugal masses, being a rigid mass attached to its planetating carrier or gear, passes through definite movements in each phase, without any internal motion, friction or heating, and its outward or return movement is not accompanied by oscillation or impact, because controlled and allowed to move outwardly in a regular and smooth manner, so that each mass passes smoothly from its outward or idle phase into the succeeding inward or transmitting phase. Such a transmission is capable of delivering substantially unlimited torque to a driven shaft turning at almost zero speed or held stationary, the delivered torque not being limited to the torque of the engine but being determined by the centrifugal force of the whirling masses, which increases with the square of the engine speed and therefore may be brought to very high amounts. The described transmitting mechanism, combined with the advantageous propeller spring described and an effective reversing mechanism, such as that shown, affords a superior automobile transmission.

When referring herein to the abutment member 55 as being stationary or anchored it is intended merely that it is held against free or substantial rotation, as a slow or small motion would not destroy the operation or principle of action; likewise in stating that the one-way device holds the shaft 48 against reverse or wrong rotation in the second or outward phase of mass movement it is not intended to exclude a slow or small movement not interfering with the action.

It will thus be seen that there has been described a power transmission apparatus embodying the principles and meeting the objects of the present invention; and since many matters of combination, arrangement, operation, mechanism and detail may be variously modified without departing from the principles of the invention it is not intended to limit the invention to such matters except so far as set forth in the appended claims.

What is claimed is:

1. Power transmission apparatus comprising the rotary driving and driven members, a revoluble support turned by the driving member, a planetary carrier on said support, a centrifugal mass secured in an eccentric position on said carrier, and connections from the driven member to the carrier for causing the carrier to rotate in a direction the opposite of the revolution of the support when the rotary speed of the driven member is less than that of the driving member.

2. Power transmission apparatus comprising the driving shaft and the driven shaft, the latter having a device preventing it rotating in the wrong direction, and a revoluble support turned by the driving shaft, in combination with a planetary carrier on the support, an unbalanced mass secured on the carrier, and connections from the driven shaft to the carrier operating to cause planetary rotation thereof in the direction opposite to the revolution of the support.

3. Power transmission apparatus comprising the rotary driving and driven members, means to prevent backward rotation of the driven member, a revoluble support turned by the driving member, a planetary carrier on said support, a centrifugal mass permanently located eccentrically on said carrier to partake of complete planetary rotation therewith and connections from the driven member to the carrier for causing the carrier to rotate in a direction the opposite of the revolution of the support when the rotary speed of the driven member is less than that of the driving member, whereby the mass in its inward phase of travel is controlled to have a substantially steady and uniform movement in space along a curve approaching to the axis of the revoluble support, and in its outward travel is controlled to move substantially uniformly to the point of beginning of the next inward movement.

4. Power transmission apparatus comprising the rotary driving and driven members, a revoluble support turned by the driving member, a centrifugal mass permanently mounted on the support for planetary travel thereon, and connections from the driven member for causing the mass to travel planetarily on the support in a direction the opposite of the revolution of the support.

5. Power transmission apparatus as in claim 2 and wherein the recited connections comprise a central gear on the driven shaft, a planet gear on the carrier, the two out of direct engagement, and a transmitting connecting means between said gear such that when the driven shaft gear is held the revolution of the support in one direction causes the carrier to rotate oppositely.

In testimony whereof, we have affixed our signatures hereto.

JOHN REECE.
FRANKLIN A. REECE.